(12) United States Patent
Imagawa

(10) Patent No.: US 10,796,815 B2
(45) Date of Patent: *Oct. 6, 2020

(54) INSULATING MATERIAL AND WIRING MEMBER

(71) Applicant: KYOCERA Corporation, Kyoto-shi, Kyoto (JP)

(72) Inventor: Kazuki Imagawa, Kirishima (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/309,012

(22) PCT Filed: Jun. 28, 2017

(86) PCT No.: PCT/JP2017/023706
§ 371 (c)(1),
(2) Date: Dec. 11, 2018

(87) PCT Pub. No.: WO2018/003839
PCT Pub. Date: Jan. 4, 2018

(65) Prior Publication Data
US 2019/0252090 A1 Aug. 15, 2019

(30) Foreign Application Priority Data
Jun. 29, 2016 (JP) .................. 2016-128972

(51) Int. Cl.
*H01B 3/00* (2006.01)
*H01B 3/42* (2006.01)
*B32B 27/36* (2006.01)
*H01B 5/14* (2006.01)
(Continued)

(52) U.S. Cl.
CPC ............ *H01B 3/42* (2013.01); *B32B 27/36* (2013.01); *H01B 3/00* (2013.01); *H01B 3/30* (2013.01); *H01B 5/14* (2013.01); *H01B 7/02* (2013.01)

(58) Field of Classification Search
CPC ..................................... H01B 3/004
(Continued)

(56) References Cited

U.S. PATENT DOCUMENTS 3,867,315 A * 2/1975 Tigner ................ H01B 1/00
252/512
4,115,371 A * 9/1978 Bier .................... C08K 3/32
524/605

(Continued)

FOREIGN PATENT DOCUMENTS

CN 1630680 A 6/2005
CN 107108923 A 8/2017
(Continued)

*Primary Examiner* — Chau N Nguyen
(74) *Attorney, Agent, or Firm* — Volpe and Koenig, P.C.

(57) ABSTRACT

There is provided an insulating material including a composite resin material comprising an organic resin and minute particles containing a metal element. The organic resin includes a resin material including polyester as a main backbone thereof and having an alkoxy group. The minute particles have an average particle size of greater than or equal to 0.5 nm but less than or equal to 50 nm. Such an insulating material is used as an insulating layer of a wiring member (wiring board, covered electric wire, etc.) including a conductor and the insulating layer which covers the conductor.

7 Claims, 3 Drawing Sheets

(51) Int. Cl.
  *H01B 3/30* (2006.01)
  *H01B 7/02* (2006.01)
(58) Field of Classification Search
  USPC .................................................. 174/102 SC
  See application file for complete search history.

(56) References Cited

U.S. PATENT DOCUMENTS

| | | | |
|---|---|---|---|
| 7,439,294 B2 * | 10/2008 | Xia | B29C 49/0005 523/200 |
| 2005/0020803 A1 | 1/2005 | Machida et al. | |
| 2015/0069290 A1 * | 3/2015 | Guo | C09K 5/14 252/75 |
| 2017/0352480 A1 * | 12/2017 | Kato | B60L 9/18 |
| 2018/0148574 A1 * | 5/2018 | Okamura | B60L 50/51 |

FOREIGN PATENT DOCUMENTS

| | | | |
|---|---|---|---|
| EP | 3276632 A1 | | 1/2018 |
| EP | 3309193 A1 | | 4/2018 |
| JP | 11-255883 A | | 9/1999 |
| JP | 2000-248065 A | | 9/2000 |
| JP | 2001-172482 | * | 6/2001 |
| JP | 2001-338413 A | | 12/2001 |
| JP | 2002-284975 A | | 10/2002 |
| JP | 2015-180524 A | | 10/2015 |
| JP | 6085069 B | | 2/2017 |
| WO | WO 94/13464 | * | 6/1994 |
| WO | 2003/059995 A1 | | 7/2003 |
| WO | 2016/104398 A1 | | 6/2016 |

\* cited by examiner

INSULATING MATERIAL AND WIRING MEMBER

CROSS-REFERENCE TO RELATED APPLICATIONS

This application is a national stage entry according to 35 U.S.C. 371 of PCT Application No. PCT/JP2017/023706 filed on Jun. 28, 2017, which claims priority to Japanese Application No. 2016-128972 filed on Jun. 29, 2016, which are entirely incorporated herein by reference.

TECHNICAL FIELD

The present invention relates to an insulating material and a wiring member.

BACKGROUND

Insulating organic resin materials have been used for insulating coatings for electric wires, insulating layers of a wiring board, etc. in electronic components, and various types of materials are present. Usage environment of electronic components is getting higher due to electronic equipment downsizing and the like. These electronic components are thus required to exhibit heat resistance with stability for a long period of time even in a high-temperature environment.

As an insulating material having excellent heat resistance, for example, in Japanese Unexamined Patent Publication JP-A 11-255883 (1999) (Patent Literature 1), an organic-inorganic polymer hybrid material formed of a polyarylate material with metal alkoxide introduced therein has been proposed.

SUMMARY

An insulating material according to a present disclosure includes a composite resin material including an organic resin and minute particles containing a metal element, wherein the organic resin includes a resin material including polyester as a main backbone thereof and having an alkoxy group, and the minute particles have an average particle size of greater than or equal to 0.5 nm but less than or equal to 50 nm.

A wiring member according to the present disclosure includes a conductor and an insulating layer which covers the conductor, the insulating layer including the insulating material mentioned above.

DETAILED DESCRIPTION

As shown in FIGS. 1A to 2C, a wiring member according to the present embodiment comprises a conductor 1 and an insulating layer 2 which covers the conductor 1.

Figure 1A:
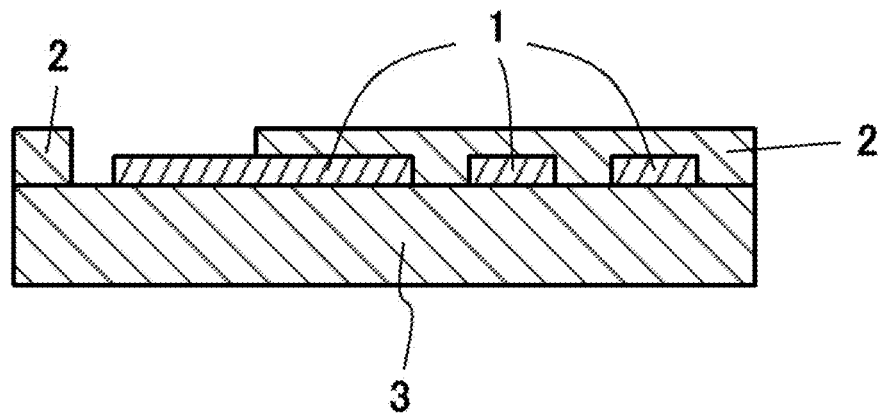
FIG. 1A is a sectional view schematically showing an example of a wiring board.
Figure 1B:
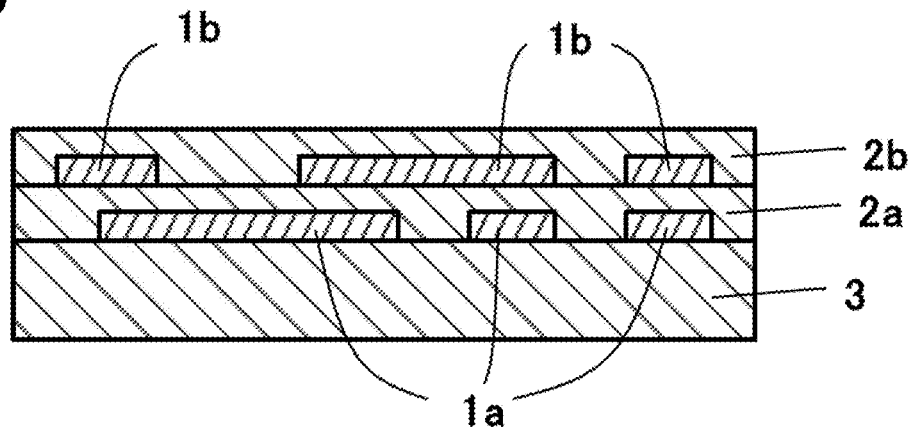
FIG. 1B is a sectional view schematically showing another example of the wiring board.

FIG. 1A shows schematically the section of an example of a wiring board which is the wiring member, and FIG. 1B shows schematically the section of another example of the wiring board.

In the printed circuit board shown in FIG. 1A, the conductor 1 is formed as circuit wiring on the surface of a plate-like substrate 3 (hereafter also referred to simply as "substrate 3"), and the insulating layer 2 is disposed over the conductor 1. For example, the insulating layer 2 is disposed so as to expose only a part of the conductor 1 which makes connection with an electronic component on the surface of the printed circuit board.

FIG. 1B is a sectional view showing an example of a multilayer board. In the multilayer board shown in FIG. 1B, a conductor 1a is formed as circuit wiring on the surface of the platy substrate 3, and an insulating layer 2a is disposed over the conductor 1a. There is further provided a conductor 1b formed as circuit wiring on the insulating layer 2a, and an insulating layer 2b is disposed over the conductor 1b. The conductor 1a and the conductor 1b may be electrically connected to each other via a via hole or a through hole formed in the insulating layer 2a. For example, the insulating layer 2b is disposed so as to expose only a part of the conductor 1b which makes connection with an electronic component on the surface of the multilayer board.

Passive components such as an inductor, a capacitor and a resistor may be embedded within the wiring board, and these passive components may be connected to the circuit wiring. Moreover, the number of layers each comprising the insulating layer 2 and the conductor 1 may be increased to three or more. In addition, a layer or layers different from the layer comprising the circuit wiring and the insulating layer 2 may be additionally provided.

Figure 2A:
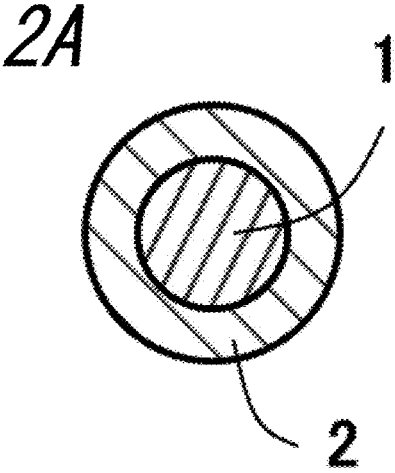
FIG. 2A is a sectional view schematically showing an example of a covered electric wire.
Figure 2B:
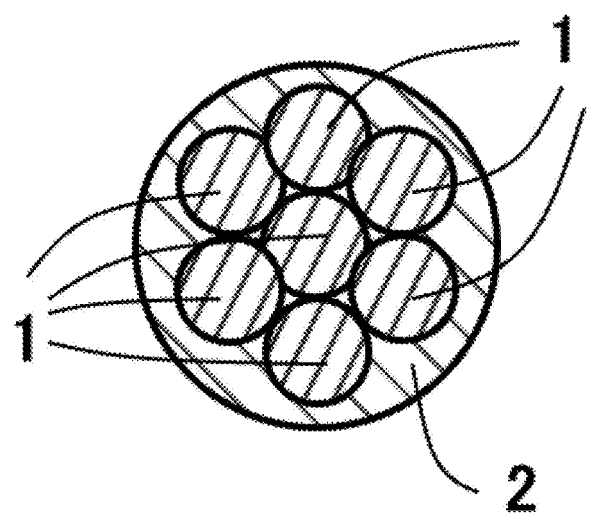
FIG. 2B is a sectional view schematically showing another example of the covered electric wire.
Figure 2C:
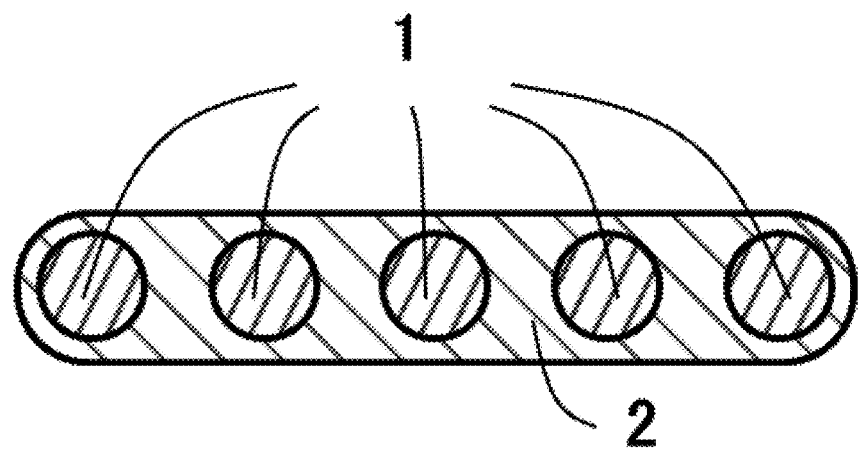
FIG. 2C is a sectional view schematically showing still another example of the covered electric wire.

FIGS. 2A to 2C are each a view schematically showing the section of a covered electric wire which is an electric wire serving as the conductor 1 (hereafter also referred to as "wire 1") covered with the insulating layer 2. Note that the wire according to the present disclosure is not limited to a power conductor, but may be construed as encompassing conductors for electrical machinery and apparatus and those for communication purposes. FIG. 2A shows a single wire 1 covered with the insulating layer 2. FIG. 2B shows the stranded wire composed of a plurality of wires 1 wholly covered with the insulating layer 2. FIG. 2C shows an array of a plurality of spaced apart wires 1 wholly covered with the insulating layer 2, wherein electrical isolation between adjacent wires 1 is provided by interposing the insulating layer 2 between the plurality of wires 1. Each such covered wire 1 (covered electric wire) serves as the wiring member comprising the conductor 1 and the insulating layer 2. The insulating layer 2 is typically formed of enamel, polyvinyl chloride, etc.

Figure 3:
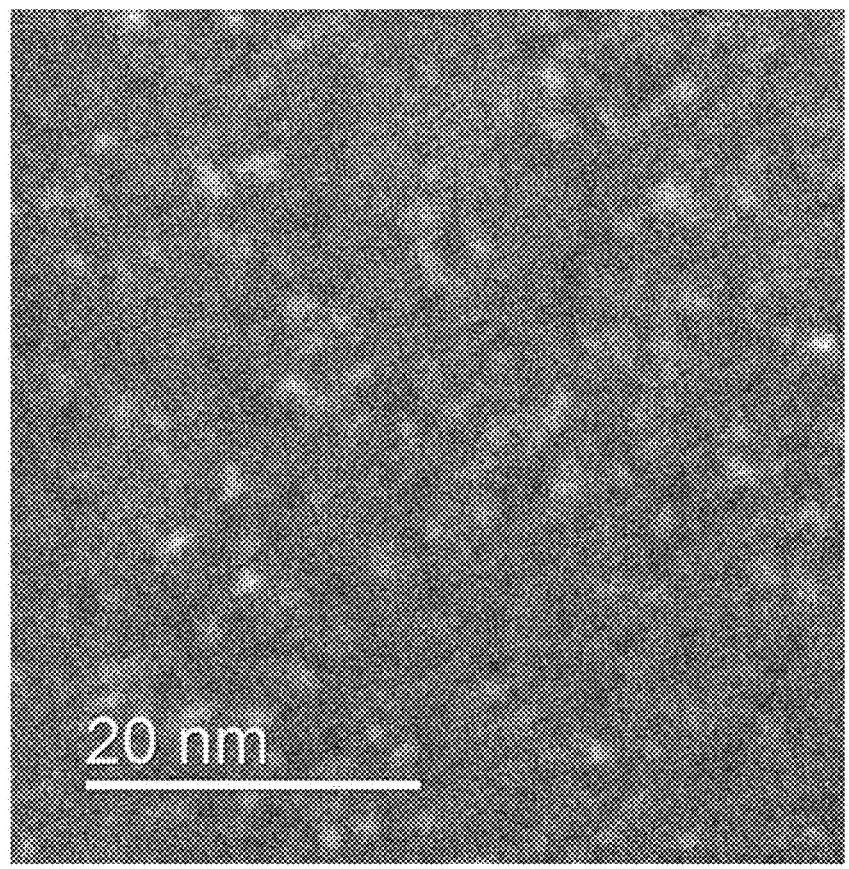
FIG. 3 is a photograph of an insulating material according to the present embodiment taken by a transmission electron microscope (TEM)
Figure 4:
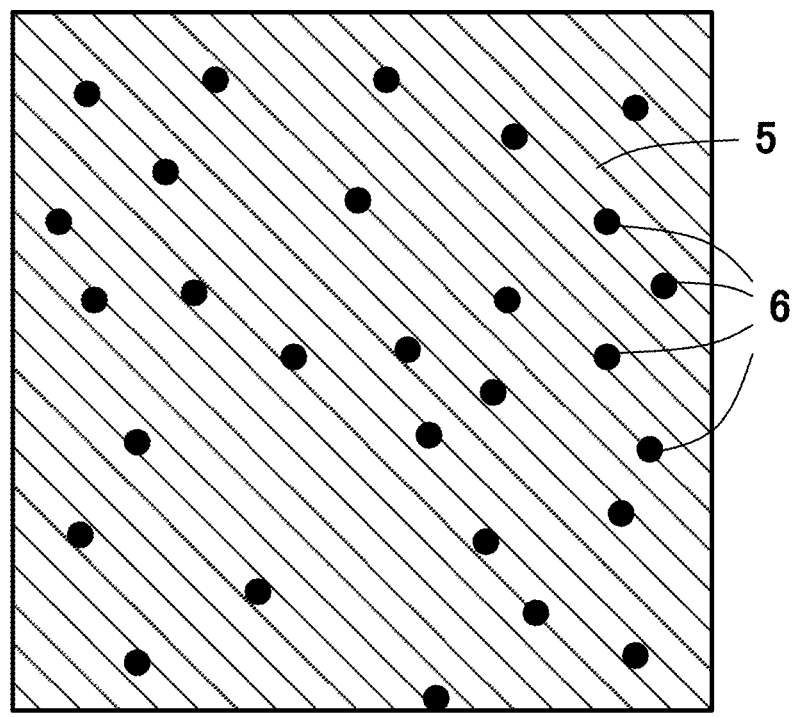
FIG. 4 is a sectional view schematically showing the structure of the insulating material according to the present embodiment.

In this embodiment, the insulating layer 2 contains an insulating material predominantly composed of a resin composite as shown in FIGS. 3 and 4. As schematically shown in FIG. 4, the resin composite comprises an organic resin 5 and minute particles 6. The organic resin 5 contains a resin material comprising polyester as a main backbone thereof and having an alkoxy group. The minute particle 6 contains a metal element, and the average particle size of the minute particles 6 is greater than or equal to 0.5 nm, but less than or equal to 50 nm.

Examples of the resin material comprising polyester as the main backbone include polycarbonate, polyarylate, and polymers of these substances. Such materials will hereafter be collectively called polycarbonate and polyarylate. Polycarbonate and polyarylate are preferred for use as the organic resin 5 constituting the insulating layer 2 on account of their excellent heat resistance, mechanical characteristics, and electrical characteristics (insulation properties and dielectric characteristics). Polyarylate, in particular, exhibits high relative permittivity, and can thus be used for a capacitor.

In such a resin material, the binding of an alkoxy group to the main backbone (polyester) achieve further improvement in insulation capability (withstand voltage).

The general view is that electrical insulation shows a correlation with the polarity of a substance, and as a rule, the lower the polarity, the higher the electrical insulation capability (withstand voltage), or equivalently, the higher the polarity, the lower the electrical insulation capability (withstand voltage). Polycarbonate and polyarylate have a chemical structure with relatively high polarity, whereas an alkoxy group is a functional group with low polarity. Thus, introducing an alkoxy group, which is a functional group with low polarity, into the molecules, or the main backbone in particular, of polycarbonate and polyarylate with high polarity makes it possible to enhance the withstand voltage of polycarbonate and polyarylate.

As to a resin material other than polycarbonate and polyarylate, in the case of the resin material comprising polyester as a main backbone thereof, since an alkoxy group is bound to the main backbone (polyester), it is possible to similarly improve insulation capability (withstand voltage).

It is preferable that the main backbone of the resin material containing polyester as the main backbone and an alkoxy group are bound together by ester binding. Under normal conditions, in response to a reaction between a polymer and metal alkoxide, cross-links are formed between the functional group of the polymer and metal alkoxide through hydrolytic degradation and polycondensation. In consequence, the reacted polymer has a metal alkoxide group in an intramolecular main backbone thereof.

In this regard, according to this embodiment, an alkoxy group resulting from degradation of metal alkoxide is bound to the main backbone of the resin material, and the main backbone of the resin material is free of any metal element. This makes it possible to maintain the excellent heat resistance, mechanical characteristics, and electrical characteristics of the resin material. In this case, the main backbone of the resin material and an alkoxy group are bound together by ester binding.

An alkoxy group content in the organic resin 5 falls in a range of 0.05% or more and 11% or less, or preferably in a range of 0.5% or more and 5.0% or less, or particularly preferably in a range of 1.0% or more and 3.5% or less, in terms of ratio by mole, with respect to the whole of ester binding present in the organic resin 5. The fulfillment of such an alkoxy group content-range requirement makes it possible to enhance the insulation capability of the organic resin 5 in itself while maintaining the heat resistance and the mechanical characteristics of the organic resin 5.

The condition of binding between the resin material and an alkoxy group, and the alkoxy group content in the organic resin 5 (the ratio by mole of an alkoxy group to the whole of ester binding present in the organic resin 5) can be examined by nuclear magnetic resonance (NMR) spectroscopy, and more specifically, by conducting $^1$H-NMR (Proton NMR) spectrometry, $^{13}$C-NMR spectrometry, and HMQC (Heteronuclear Multiple Quantum Coherence) spectrometry and HMBC (Heteronuclear Multiple Bond Connectivity) spectrometry based on two-dimensional correlation NMR spectroscopy.

In this embodiment, the metal element-containing minute particle 6 (hereafter also referred to simply as "minute particle 6") may be defined as a group of a plurality of metal elements gathering in proximity to one another in a minute region. In the section of the insulating material (resin composite) as observed under a transmission electron microscope (TEM) or scanning transmission electron microscope (STEM), as shown in FIG. 3, bleached-looking metal elements apparently gather in proximity to one another within a range which measures several nanometers across, for example. In other words, the minute particle 6 is a group of a plurality of metal elements gathering in particulate form in a minute region. Moreover, the minute particle 6 may also be defined as a minute cluster of a plurality of metal elements.

Thus, in the TEM (STEM) photograph, the insulating layer 2 (insulating material) according to this embodiment contains the minute particle 6 in the form of a cluster of a plurality of bleached-looking metal elements gathering in proximity to one another in a region which measures 0.5 to 50 nm across. A plurality of such minute particles 6 are dispersed in the organic resin 5.

The presence of the metal element-containing minute particle 6 can be checked by observation of the section of the insulating material (resin composite) under a transmission electron microscope (TEM) or scanning transmission electron microscope (STEM) as described above. For example, it is advisable that a sample under observation has a thickness of less than or equal to 100 nm. It is advisable that the sample is observed at a 1500000 to 3000000-fold magnification. Observation of a HAADF (High Angle Annular Dark Field) image using a scanning transmission electron microscope (STEM) is particularly suitable for the checking.

It is heretofore known that, with the dispersion of fillers of metal element-containing inorganic compound particles in an organic resin, electric charges moving in the organic resin are trapped by the inorganic compound particles, with the consequent attainment of a local electric-field concentration-reducing effect. Under normal circumstances, fillers of inorganic compound particles having an average particle size in a range of about a few dozen nanometers to a few hundred nanometers are mixed in a dispersed state in an organic resin. In such a preparation, what is conducive to the trapping of electric charges is believed to be a metal element contained in the inorganic compound particle.

In this embodiment, it is believed that the metal element-containing minute particle 6 traps electric charges moving in the organic resin 5 for suppressing local electric-field concentration. While the metal element-containing minute particle 6 may be formed of an inorganic compound containing a metal element, preferably, the minute particle 6 is formed of an organic compound containing a metal element, or a mixture of an inorganic compound and an organic compound containing a metal element. The use of a metal element-containing organic compound, or a metal element-containing mixture of an inorganic compound and an organic compound, for the metal element-containing minute particle 6 allows dispersion of metal elements in the form of more minute clusters in the organic resin 5, and thus affords a higher local electric-field concentration-suppressing effect.

The mean value of the diameters of the metal element-containing minute particles 6 (average particle size) falls in a range of 0.5 nm or more and 50 nm or less, or preferably in a range of 0.5 nm or more and 10 nm or less, or particularly preferably in a range of 1 nm or more and 3 nm or less. For example, the average particle size of the metal element-containing minute particles 6 can be determined through image analyses of a section photograph taken by a transmission electron microscope (TEM) or scanning transmission electron microscope (STEM), or analyses of profile data obtained by measurement using the small angle X-ray scattering method.

The attainment of the local electric-field concentration-reducing effect by such a metal element-containing minute particle 6 is believed to be due to the form of the minute particle 6 in which a plurality of metal elements gather in proximity to one another in a minute region. For example, as described above, it has been customary to introduce a metal element into the main backbone of a resin material by forming cross-links between the functional group of the resin material and metal alkoxide through hydrolytic degradation and polycondensation (refer to Patent Literature 1). In this case, however, the condition where a plurality of metal elements gather in proximity to one another in a minute region within the organic resin 5 cannot be achieved merely by introducing a metal element into the main backbone of the resin material under crosslinking of the main backbone with metal alkoxide, and consequently an insulation-enhancing effect cannot be obtained with ease. For example, the material disclosed in Patent Literature 1 exhibits a withstand voltage (dielectric breakdown field) of at most about 330 V/µm.

In this embodiment, in the insulating material constituting the insulating layer 2, there is provided the minute particle 6 in the form of a plurality of metal elements gathering in proximity to one another in a minute region. Dispersion of the plurality of minute particles 6 in the organic resin 5 allows further enhancement in the insulation capability (withstand voltage, i.e. dielectric breakdown field) of the insulating material (insulating layer 2).

A metal element content in the resin composite falls in a range of 0.05% by mass or more and 5.0% by mass or less, or preferably in a range of 0.1% by mass or more and 4.0% by mass or less, or particularly preferably in a range of 0.2% by mass or more and 3.0% by mass or less. The metal element is preferably included in the minute particle 6 lying between the molecules of the organic resin 5.

The volume percentage of the metal-containing minute particles 6 contained in the resin composite falls in a range of 0.4% by volume or more and 40% by volume or less, or preferably in a range of 2% by volume or more and 20% by volume or less, or particularly preferably in a range of 5% by volume or more and 18% by volume or less. For example, the volume percentage of the metal-containing minute particles 6 contained in the resin composite (insulating material) can be determined by analyzing profile data obtained by measurement using the small angle X-ray scattering method.

Examples of the metal element contained in the insulating material include Si, Ti, Zr, Fe, Cu, Sn, Al, Ge, Ta, and W, and in the present disclosure, further include Si and Ge. In particular, at least one element selected from Si, Ti, Zr, and Al is desirable for use as the metal element contained in the insulating material. In the preparation of the resin composite, the use of metal alkoxide derived from such a metal element group (Si, Ti, Zr, and Al) helps facilitate formation of the metal element-containing minute particle 6 in the organic resin 5.

The metal element contained in the insulating material is not limited to a single element. Two or more different types of metal elements may be contained in the insulating material. For example, the type and content of the metal element contained in the insulating material can be determined by high-frequency inductively coupled plasma (ICP) emission spectrometry.

The organic resin 5 may contain a highly heat-resistant, weatherproof resin material such as poly phenylene ether (PPE), a cyclic olefin (COP) resin, or a polyetherimide (PEI) resin. In particular, at least one substance selected from the resin material group consisting of PPE, COP resins, and PEI resins is preferably included in the organic resin 5. Such a highly heat-resistant, weatherproof resin material imparts greater heat resistance and weather resistance to the insulating material. The resin material group consisting of PPE, COP resins, and PEI resins is preferred for use on account of its solubility in an organic solvent and easiness in mixture with metal alkoxide.

The wiring member according to this embodiment may further comprise, in addition to the insulating layer 2 made of the above-described resin composite, a layer formed of other material. Moreover, the conductor 1 and the insulating layer 2 may be either spaced apart or kept in intimate contact with each other. As another alternative, the conductor 1 and the insulating layer 2 may be bonded together by an adhesive, for example.

(Manufacturing Method)

The insulating material and the wiring member according to this embodiment can be obtained by the following procedure, for example. A first resin solution is prepared by dissolving a resin material comprising polyester as the main backbone (organic resin) in an organic solvent. Likewise, a metal alkoxide solution is prepared by dissolving metal alkoxide in an organic solvent. In an inert atmosphere, the metal alkoxide solution is mixed with the first resin solution so prepared, and the mixture is stirred for 24 hours or more. Such procedural steps are performed in an inert atmosphere (dry nitrogen, for example) to initiate a metal alkoxide-to-metal alkoxide condensation reaction while inhibiting hydrolytic degradation of metal alkoxide. This reaction yields metal element-containing minute particles 6, and consequently, there is obtained a resin composite solution comprising the organic resin 5 and the metal element-containing minute particles 6.

At this time, in a polymer comprising polyester as the main backbone such as polycarbonate or polyarylate, metal alkoxide decomposes ester binding in the polymer, and an alkoxy group of metal alkoxide is bound to a part of the polymer subjected to ester binding decomposition under an addition reaction.

In the case of mixing another resin material in the group consisting of PPE, COP resins, and PEI resins, a second resin solution is prepared by dissolving such a resin material in an organic solvent, and the second resin solution is mixed with the described resin composite solution to prepare a resin solution mixture.

For example, on the platy substrate 3 formed with circuit wiring serving as the conductor 1, there is provided a resin composite coating formed of the resin composite solution or the resin solution mixture (hereafter referred to simply as "resin composite solution"), and subsequently the insulating layer 2 is formed thereon, whereupon a wiring board is obtained. As the coating-forming method, it is possible to use one heretofore known film-forming technique selected from doctor blade technique, die coater technique, and knife coater technique.

Moreover, the covered electric wire may be produced by immersing the wire 1 (conductor 1) into the resin composite solution and thereafter lifting the wire out of the solution (i.e., dipping). Alternatively, the covered electric wire may be produced by spraying the resin composite solution on the wire 1 (conductor 1) to form a resin composite coating.

The resin composite solution may also be applied onto a formation-support body such as a polyethylene terephthalate (PET)-made film. As uses of the thus obtained film of insulating material, it may be laminated on the substrate 3 or may be wound around the wire 1.

The insulating layer 2 according to this embodiment can be preferably used also as a thin insulating layer 2 having a mean thickness of less than or equal to 5 μm, or particularly 1 to 5 μm.

Examples of the described resin material comprising polyester as the main backbone include polymers such as polycarbonate having a repeating unit defined in the general formula (1) and polyarylate having a repeating unit defined in the general formula (2) or the general formula (3).

[Chemical Formula 1]

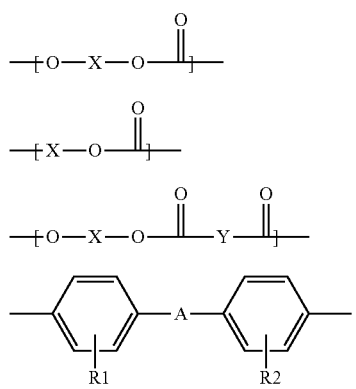

In the general formula (1), the general formula (2), or the general formula (3), X represents at least one divalent group selected from a divalent aliphatic group, a divalent cycloaliphatic group, and a divalent group expressed by the general formula (4). In the general formula (3), Y represents a substituted or unsubstituted allylene group.

In the general formula (4), R1 and R2 independently represent a substituted or unsubstituted alkyl group, aryl group, or halogen atom. A represents a single bond or straight-chain, branched, or cyclic alkylene group with 1 to 12 carbon atoms.

Divalent groups expressed by the general formulae (5a) to (5n) may be cited as specific examples of X in the described general formulae (1), (2), and (3).

[Chemical Formula 2]

(5a)

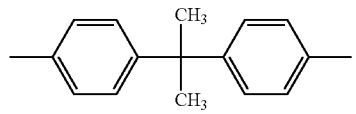

(5b)

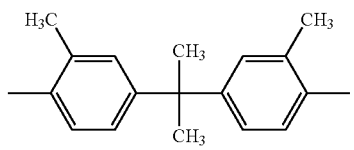

(5c)

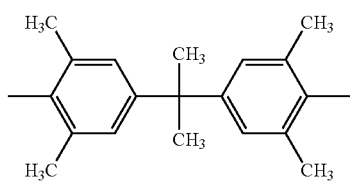

(5d)

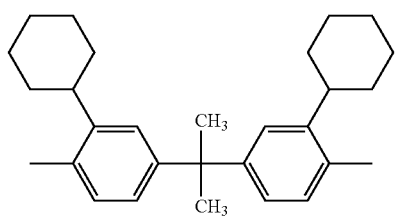

(5e)

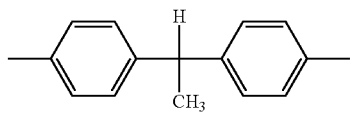

(5f)

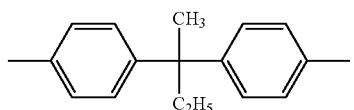

(5g)

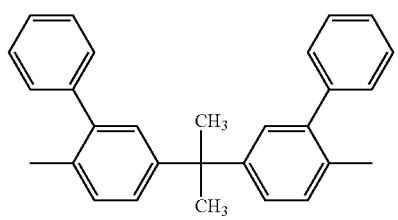

(5h)

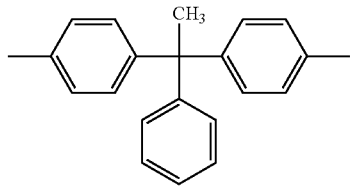

(5i)

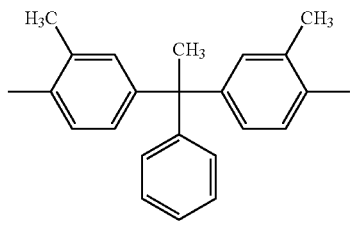

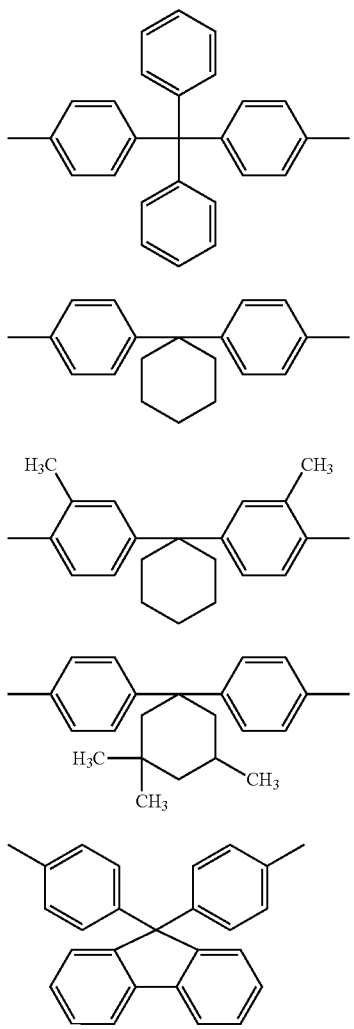

(5j)

(5k)

(5l)

(5m)

(5n)

As poly phenylene ether, it is possible to use those containing, for example, a polymer or copolymer of nuclear-substituted phenol, and on an as-needed basis, a styrene polymer or a rubber-modified styrene polymer. A resin material having such a phenylene ether conformation is preferred for use in various structural parts and electric or electronic components on account of its excellence in heat resistance and insulation capability.

Examples of the cyclic olefin resin material include a norbornene ring-opening polymer and a norbornene vinyl copolymer. In addition, as the cyclic olefin resin material, it is possible to use a hydrogen additive of a ring-opening polymer of norbornene ring-containing monomer, an addition polymer of norbornene ring-containing monomer and α-olefins, an addition polymer of cyclic olefin, a hydrogen additive of cyclic-olefin addition polymer, an addition polymer of cyclic diene, and a hydrogen additive of cyclic-diene addition polymer.

Those resin materials, including polycarbonate and polyarylate, can be used alone or in combination. Moreover, it is possible to use a multi-component copolymer containing poly phenylene ether, a cyclic olefin resin, a polyetherimide resin, etc.

A compound as expressed by the following general formula (6) may be cited as an example of metal alkoxide.

$$B_pM \quad (6)$$

In the general formula (6), B represents an alkoxy group with 1 to 8 carbons, or preferably 1 to 4 carbons, M represents a metal element such as Si, Ti, Zr, Fe, Cu, Sn, Al, Ge, Ta, or W, and p represents an integer of 2 to 6.

Specific examples of metal alkoxide include: tetraalkoxysilanes such as tetramethoxysilane, tetraethoxysilane, tetraisopropoxysilane, and tetrabutoxysilane; tetraalkoxytitaniums such as tetra-n-propoxytitanium, tetraisopropoxytitanium, and tetrabutoxytitanium; tetraalkoxyzirconiums such as tetra-n-propoxyzirconium, tetraisopropoxyzirconium, and tetrabutoxyzirconium; dimethoxycopper; tributoxyaluminum; tetraethoxygermanium; penta-n-propoxytantalum; and hexaethoxytungsten.

A compound as expressed by the following general formula (7) may be adopted as another example of metal alkoxide.

$$R3_kB_lM\,(R4_mZ)_n \quad (7)$$

In the general formula (7), R3 represents hydrogen or an alkyl group or phenyl group with 1 to 12 carbons, or preferably 1 to 5 carbons, B represents an alkoxy group with 1 to 8 carbons, or preferably 1 to 4 carbons, M represents a metal element such as Si, Ti, Zr, Fe, Cu, Sn, Al, Ge, Ta, or W, R4 represents an alkylene group or alkylidene group with 1 to 4 carbons, or preferably 2 to 4 carbons, Z represents a general functional group such as an isocyanate group, an epoxy group, a carboxyl group, an acid halide group, an acid anhydride group, an amino group, a thiol group, a vinyl group, a methacryl group, or a halogen group, k represents an integer of 0 to 5, l represents an integer of 1 to 5, m represents 0 or 1, and n represents an integer of 0 to 5.

It is preferable that an organic solvent used to dissolve the resin material and an organic solvent used to dissolve metal alkoxide are identical. As the organic solvent, it is possible to use an organic solvent containing, for example, methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethyl acetamide, cyclohexane, toluene, chloroform, tetrahydrofuran, or a mixture of two or more substances selected from those named just above.

For example, the concentration of the resin material contained in each of the first resin solution and the second resin solution (resin concentration) falls in a range of 10% by mass or more and 40% by mass or less, or preferably in a range of 20% by mass or more and 30% by mass or less. For example, the concentration of metal alkoxide contained in the metal alkoxide solution (metal alkoxide concentration) falls in a range of 1% by mass or more and 50% by mass or less, or preferably in a range of 2% by mass or more and 30% by mass or less. Moreover, in mixing the first resin solution and the metal alkoxide solution, for example, the ratio of metal alkoxide to 100 parts by mass of the resin material falls in a range of 0.05 parts by mass or more and 10 parts by mass or less, or preferably in a range of 0.1 part by mass or more and 6.0 parts by mass or less.

The size of the metal element-containing minute particle 6 may be adjusted by the metal alkoxide concentration of the metal alkoxide solution. As a general rule, the higher the metal alkoxide concentration, the larger the size of the minute particle 6 to be formed. Moreover, the size of the minute particle 6 depends upon the reactivity of metal alkoxide. Metal alkoxides of different types vary in reactivity. For example, zirconium (IV) butoxide (Zr-n-but) containing zirconium has relatively low reactivity, and tends to form a relatively small minute particle 6. On the other hand, titanium (IV) butoxide (Ti-n-but) containing titanium has relatively high reactivity, and tends to form a relatively large minute particle 6.

As mixing (stirring) conditions, for example, the first resin solution and the metal alkoxide solution are mixed and stirred at a temperature of 10 to 30° C. and at 100 to 500 rpm with use of a stirrer or a mixing rotor. The stirring time is set at to 96 hours. Minute particles 6 of varying sizes can be obtained by making proper adjustment to the temperature and the stirring conditions. The formation process involving a step of preparation of the first and second resin solutions and the metal alkoxide solution and a mixing-stirring step may be performed in a dry nitrogen atmosphere.

The application of the insulating material according to this embodiment is not limited to the wiring member comprising the conductor 1 and the insulating layer 2. The insulating material according to this embodiment finds a wide range of applications. For example, the insulating material may be interposed between wiring lines as a spacer, may be blended in an insulating adhesive as a constituent component, or may be used, with a conductive filler dispersed therein, for an anisotropic conductive film. Moreover, the insulating material may be used as a sealing material, a filling material, an exterior member, or a paint in an electronic component, electronic equipment, or an electric appliance.

EXAMPLES

Example 1

Polyarylate resin comprising polyester as the main backbone as described in the paragraph of Production Example 1 in Japanese Unexamined Patent Publication JP-A 2013-76042 was used as the resin material. Zirconium (IV) butoxide (Zr-n-but), acetoalkoxyaluminum diisopropylate (Al-M), and titanium (IV) butoxide (Ti-n-but) were used as metal alkoxide.

The prepared polyarylate resin was heated in a vacuum at 120° C. for 3 hours to remove moisture adsorbed onto the polyarylate resin. The polyarylate resin thus obtained was dissolved in toluene to obtain a resin solution of a 25% by mass resin concentration as the first resin solution. Moreover, each metal alkoxide was dissolved in toluene to obtain a metal alkoxide solution of a 5% by mass metal alkoxide concentration, and also a Zr-n-but solution of a 50% by mass metal alkoxide concentration. Each metal alkoxide solution was admixed in the first resin solution to prepare a mixture solution. The amount of the metal alkoxide solution to be added was adjusted so that the ratio (part by mass) of metal alkoxide to 100 parts by mass of polyarylate corresponded to each value shown in Table 1. The mixture solution thus prepared was stirred by a stirrer at 300 rpm for 24 hours to obtain a composite resin solution. Each and every step in the solution preparation process was performed in a dry nitrogen atmosphere at room temperature.

Insulating films (Sample Nos. 1 to 12) were produced by applying each composite resin solution onto a formation-support body constructed of a polyethylene terephthalate (PET)-made film (hereafter referred to simply as "PET film") by a coater, and thereafter drying the film body for 1 hour at 180° C. to remove the solvent. The insulating film of Sample No. 1 was produced from a metal alkoxide-free resin solution, and the insulating film of Sample No. 8 was produced from the 50% by mass Zr-n-but solution. Each insulating film had a thickness of 3.5 μm.

(Characteristics Evaluation)

$^1$H-NMR (Proton NMR) spectrometry has been performed on each insulating film thus produced. A peak other than a polyarylate-derived peak was observed in the obtained $^1$H-NMR spectrum. The result of HMQC spectrometry and HMBC spectrometry based on Two-dimensional correlation NMR spectroscopy showed that this peak resulted from hydrogen bound to a carbon atom contiguous to an oxygen atom of each alkoxy group. This means that the alkoxy group was bound directly to the main backbone of the organic resin by ester binding without intermediary of a metal element. There was no sign of any peak derived from unreacted metal alkoxide. Moreover, the ratio of alkoxy groups to the whole of ester binding contained in each insulating film was determined by calculation on the basis of the obtained $^1$H-NMR spectrum. Calculated values were listed in terms of alkoxy group content in Table 1.

The type of a metal element contained in each insulating film and its content were examined by ICP emission spectrometry. The metal element contained in the insulating film was judged as being identical with the metal element constituting metal alkoxide added to the resin material. Table 1 shows a metal element content.

Each insulating film was made into a film piece having a thickness of less than or equal to 100 nm by a microtome, and the section of the piece was observed using a scanning transmission electron microscope (STEM, JEOL Ltd., JEM-ARM 200F, HAADF image, accelerating voltage: 200 kV) at 3000000-fold magnification. A carbon-coated grid mesh was used as a support film for a sample under observation. The result of observations showed that metal element-containing minute particles were present in the insulating films of Sample Nos. 2 to 12.

The average particle size of the minute particles was determined by analyzing profile data obtained by measurement using small angle X-ray scattering method. Table 1 shows an average particle size of minute particles.

Insulation-property (breakdown electric field, abbreviated as BDE) of each insulating film was measured in the following manner. After removing the PET film from the insulating film, an Al metallic layer having a mean thickness of 75 nm was formed on each side of the insulating film by vacuum deposition to obtain a film bearing metallic layers.

The breakdown voltage of the thus obtained metallic layer-bearing film was measured to determine breakdown electric field (BDE). More specifically, DC voltage was applied between the opposite metallic films with the insulating film lying in between at a voltage raising rate of 10 V/sec, and the value of voltage obtained at the instant at which the level of leakage current exceeded 1.0 mA was defined as the breakdown voltage. Table 1 shows a breakdown electric field (BDE) of the insulating film.

TABLE 1

| | Metal alkoxide | | | Insulating film | | |
|---|---|---|---|---|---|---|
| Sample No. | Type | Addition amount*[1] part by mass | Alkoxy group content*[2] % | Metal element content % by mass | Average particle size of metal element-containing minute particles nm | Breakdown electric field (BDE) V/μm |
| 1 | Not found | — | — | — | — | 420 |
| 2 | Zr-n-but | 0.05 | 0.06 | 0.01 | 1 | 430 |
| 3 | Zr-n-but | 0.5 | 0.6 | 0.12 | 1 | 460 |
| 4 | Zr-n-but | 1 | 1.1 | 0.24 | 1 | 470 |
| 5 | Zr-n-but | 2 | 2.2 | 0.48 | 1 | 480 |
| 6 | Zr-n-but | 3 | 3.3 | 0.71 | 1 | 480 |
| 7 | Zr-n-but | 10 | 11 | 2.38 | 1 | 430 |
| 8 | Zr-n-but | 1 | 1.1 | 0.24 | 50 | 430 |
| 9 | Al-M | 1 | 0.9 | 0.05 | 0.5 | 440 |
| 10 | Al-M | 3 | 2.5 | 0.16 | 0.5 | 460 |
| 11 | Ti-n-but | 1 | 1.2 | 0.14 | 1.2 | 470 |
| 12 | Ti-n-but | 3 | 3.7 | 0.42 | 1.2 | 480 |

*[1]Ratio of metal alkoxide to 100 parts by mass PAR
*[2]Ratio by mole of alkoxy group to the whole of ester binding contained in insulating film In each of Sample Nos. 2 to 12, metal element-containing minute particles were included in the organic resin with an alkoxy group bound to the main backbone thereof, and the average particle size of the minute particles fell in a range of greater than or equal to 0.5 nm but less than or equal to 50 nm. Thus, each of these samples exhibited high breakdown electric field and excellent insulation capability.

Example 2

Polyarylate comprising polyester as the main backbone (U-100 manufactured by UNITIKA LTD.) and poly phenylene ether (PPE Powder of Xyron (registered trademark) manufactured by Asahi Kasei Corporation (hereafter referred to as "PPE")) were used as the resin material.

U-100 was dissolved in chloroform to obtain a resin solution of a 20% by mass resin concentration as the first resin solution. PPE was dissolved in chloroform to obtain a resin solution of a 20% by mass resin concentration as the second resin solution.

Zirconium (IV) butoxide (Zr-n-but) and titanium (IV) isopropoxide (Ti-i-Pr) or aluminum alkyl acetoacetate diisopropylate (Al-M) were used as metal alkoxide.

Each of Zr-n-but and Ti-i-Pr or Al-M was dissolved in chloroform to obtain a metal alkoxide solution of a 10% by mass metal alkoxide concentration.

Each metal alkoxide solution was admixed in the first resin solution to prepare a mixture solution. The amount of the metal alkoxide solution was adjusted so that the ratio of metal alkoxide to 100 parts by mass U-100 corresponded to each value shown in Table 2. The mixture solution was stirred by a stirrer at 300 rpm for 24 hours to obtain a composite resin solution.

The composite resin solution and the second resin solution were mixed together so that the ratio between U-100 and PPE corresponded to each value shown in Table 2, and the mixture was stirred by a stirrer at 300 rpm for 24 hours to obtain a composite resin solution. Each and every step in the solution preparation process was performed in dry air at a dew point of lower than or equal to −50° C.

Insulating films of Sample Nos. 13 to 21 were produced by applying each composite resin solution onto a PET film by a coater, and thereafter drying the film body for 1 hour at 180° C. to let the solvent go dry. The insulating films of Samples Nos. 13 and 18 were produced from the mixture solution of the alkoxide-free first resin solution and the second resin solution. Each insulating film had a thickness of 3.5 μm.

$^1$H-NMR (Proton NMR) spectrometry was performed on each insulating film thus produced. On the basis of an integral I1 obtained by integrating spectral peaks for isophthalic acid-derived —H (corresponding to 9.0 ppm, 9.1 ppm to 8.87 ppm) in U-100 and an integral I2 obtained by integrating spectral peaks for benzene-derived —H (corresponding to 6.4 ppm to 6.9 ppm) in PPE, a U-100 content (I1/(I1+I2)) and a PPE content (I2/(I1+I2)) were determined by calculation. The ratio in content between U-100 and PPE in each insulating film were found to be as in Table 2.

A peak other than the U-100-derived peak and the PPE-derived peak was observed in the vicinity of 4.4 ppm in the $^1$H-NMR spectrum in Sample Nos. 14 to 17 and 19 to 21 with metal alkoxide added. This peak was not observed in Sample Nos. 13 and 18. Moreover, the result of HMQC (Heteronuclear Multiple Quantum Coherence) spectrometry and HMBC (Heteronuclear Multiple Bond Connectivity) spectrometry based on Two-dimensional correlation NMR spectroscopy showed that this peak resulted from hydrogen bound to a carbon atom contiguous to an oxygen atom of an alkoxy group (—OCH$_2$CH$_2$CH$_2$CH$_3$, —OCH(CH$_3$)$_2$). This means that the alkoxy group has been bound directly to the main backbone of the organic resin by ester binding without intermediary of a metal element. There was no sign of any peak derived from unreacted metal alkoxide. Moreover, the ratio of alkoxy groups to the whole of ester binding contained in each insulating film was determined by calculation on the basis of the obtained $^1$H-NMR spectrum. Calculated values were listed as an alkoxy group content in Table 2.

The type and content of a metal element contained in each insulating film were examined by ICP emission spectrometry. The metal element contained in the insulating film was judged as being identical with the metal element constituting metal alkoxide added to the resin material. Table 2 shows a metal element content.

Each insulating film was made into a film piece having a thickness of less than or equal to 100 nm by a microtome, and the section of the piece was observed using a scanning transmission electron microscope (STEM, JEOL Ltd., JEM-ARM 200F, HAADF image, accelerating voltage: 200 kV)

at 3000000-fold magnification. A carbon-coated grid mesh was used as a support film for a sample under observation. The result of observations showed that metal element-containing minute particles were present in the insulating films of Sample Nos. 14 to 17 and 19 to 21.

The average particle size of the minute particles was determined through image analyses of a photograph of the section of each insulating film taken by STEM. Table 2 shows an average particle size of minute particles.

Insulation-property (breakdown electric field, abbreviated as BDE) of each insulating film was measured in the following manner. After removing the PET film from the insulating film, an Al metallic layer having a mean thickness of 75 nm was formed on each side of the insulating film by vacuum deposition to obtain a film bearing metallic layers.

The breakdown voltage of the thus obtained metallic layer-bearing film was measured to determine breakdown electric field (BDE). More specifically, DC voltage was applied between the opposite metallic films with the insulating film lying in between at a voltage raising rate of 10 V/sec, and the value of voltage obtained at the instant at which the level of leakage current exceeded 1.0 mA was defined as the breakdown voltage. Table 2 shows a breakdown electric field (BDE) of the insulating film.

TABLE 2

| | Resin material ratio*3 | | Metal alkoxide | | Insulating film | | Average particle size of metal element-containing minute particles nm | Breakdown electric field (BDE) V/μm |
|---|---|---|---|---|---|---|---|---|
| Sample No. | U-100 part by mass | PPE part by mass | Type | Addition amount*1 part by mass | Alkoxy group content*2 % | Metal element content % by mass | | |
| 13 | 50 | 50 | Not added | — | — | — | — | 577 |
| 14 | 50 | 50 | Zr-n-but | 5 | 6.9 | 0.59 | 2 | 676 |
| 15 | 50 | 50 | Zr-n-but | 8 | 11 | 0.95 | 3 | 698 |
| 16 | 50 | 50 | Ti-i-Pr | 10 | 14 | 0.84 | 3 | 593 |
| 17 | 50 | 50 | Al-M | 10 | 4 | 0.27 | 1 | 679 |
| 18 | 25 | 75 | Not added | — | — | — | — | 693 |
| 19 | 25 | 75 | Zr-n-but | 4 | 5 | 0.24 | 2 | 741 |
| 20 | 25 | 75 | Zr-n-but | 10 | 14 | 0.59 | 3 | 789 |
| 21 | 25 | 75 | Al-M | 10 | 4 | 0.14 | 1 | 749 |

*1 Ratio of metal alkoxide to 100 parts by mass PAR (U-100)
*2 Ratio by mole of alkoxy group to the whole of ester binding contained in insulating film
*3 Ratio of each organic resin to 100 parts by mass of a total of PAR and PPE Each of Sample Nos. 14 to 17 and 19 to 21 included a resin material having a polyester structure as the main backbone with an alkoxy group added (modified U-100), and metal element-containing minute particles, and an average particle size of the minute particles fell in a range of greater than or equal to 0.5 nm but less than or equal to 50 nm. Thus, each of these samples exhibited high breakdown electric field and excellent insulation capability.

REFERENCE SIGNS LIST 1, 1a, 1b: Conductor (circuit wiring, electric wire)
2, 2a, 2b: Insulating layer
3: Substrate
5: Organic resin
6: Metal element-containing minute particle

The invention claimed is:

1. An insulating material, comprising:
a composite resin material comprising an organic resin and minute particles containing a metal element, wherein
the organic resin comprises a resin material comprising a polyester as a main backbone thereof and having an alkoxy group,
the polyester includes at least one of polycarbonate and polyarylate,
the alkoxy group and the main backbone of the resin material are bound together by ester binding,
the minute particles have an average particle size of greater than or equal to 0.5 nm but less than or equal to 50 nm, and
the metal element is contained in the composite resin material in an amount of greater than or equal to 0.05% by mass but less than or equal to 5.0% by mass.

2. The insulating material according to claim 1, wherein a ratio by mole of the alkoxy group to a whole of ester binding contained in the composite resin material is greater than or equal to 0.05% but less than or equal to 11%.

3. The insulating material according to claim 1, wherein the metal element is at least one element selected from Si, Ti, Zr, and Al.

4. The insulating material according to claim 1, wherein the organic resin further comprises at least one resin material selected from a resin material group consisting of poly phenylene ether, a cyclic olefin resin, and a polyetherimide resin.

5. A wiring member, comprising:
a conductor; and
an insulating layer which covers the conductor,
the insulating layer comprising the insulating material according to claim 1.

6. The wiring member according to claim 5, wherein the conductor includes circuit wiring disposed on a substrate.

7. The wiring member according to claim 5, wherein the conductor includes an electric wire.

* * * * *